May 4, 1948. H. W. STOLL 2,441,042
CALIBRATING MEANS FOR PITOT VENTURI TUBES
Filed April 25, 1946
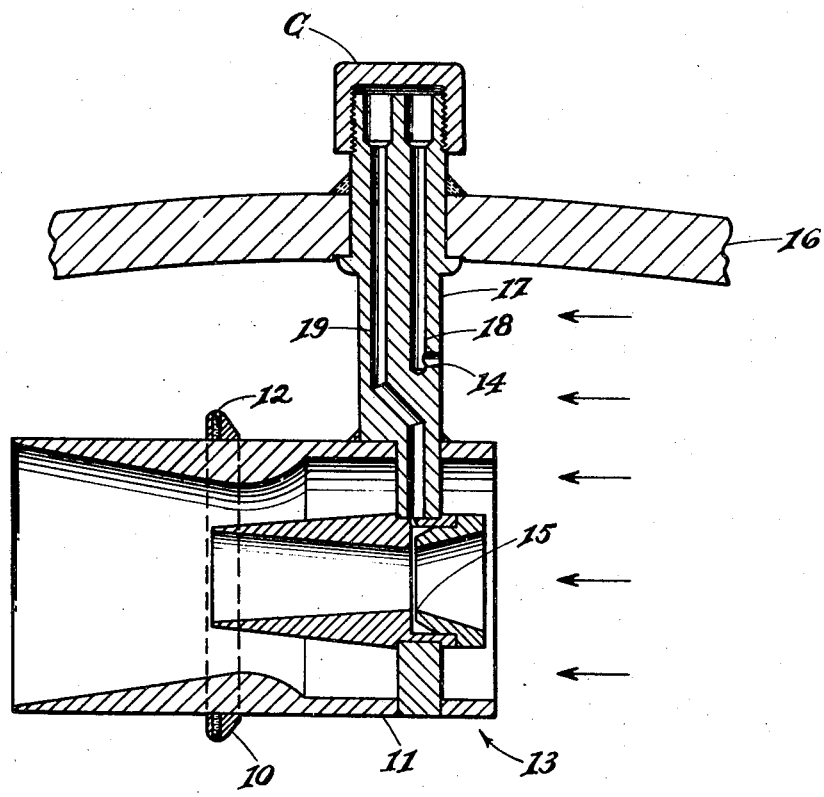
INVENTOR.
*Henry W. Stoll*
BY Patented May 4, 1948

2,441,042

UNITED STATES PATENT OFFICE 2,441,042

CALIBRATING MEANS FOR PITOT VENTURI TUBES

Henry W. Stoll, Rochester, N. Y., assignor, by mesne assignments, to the United States of America as represented by the United States Atomic Energy Commission Application April 25, 1946, Serial No. 664,815

2 Claims. (Cl. 73—3)

This invention relates to means for calibrating Pitot-Venturi tubes of the type suitable for use in a velocity head meter.

Prior to the use of the present invention each Pitot-Venturi flow element was accompanied by a chart of calibrating values since it was found in practice that, regardless of the accuracy observed in constructing the parts, flow elements having identical constants could not be produced. Consequently, when these Pitot-Venturi flow elements were used to perform identical functions it became necessary to supply a correction factor to each device used therewith, such as a differential pressure transmitter to compensate for the variable calibration constants of the individual Pitot-Venturi flow element in order to obtain equal results.

In accordance with the present invention a simple means is provided so that each Pitot-Venturi flow element will have the same calibration constant when compared with a given standard.

In accordance with a more specific aspect of the invention, there is provided a compensating ring which engages and is slidably mounted on the periphery of the Pitot-Venturi tube body so that it can be positioned and locked at a point on the tube body where the device has constants equal to that of a standard device.

The single drawing shows a sectional view of the Pitot-Venturi flow element 13 mounted within a chamber, such as a pipe or blower, wherein a gas is caused to flow. The wall section 16 represents a section of the pipe or blower wall, and the support 17 containing two channels 18 and 19, passes through the wall section 16, thus providing a means for communicating different pressures produced between a constricted throat 15, of the element 13, and an opening 14 to the channel 18, to an outside instrument, such as a differential pressure transmitter. The support 17 also provides support for the element 13. The differential pressure mentioned above is the pressure difference between the direct impact pressure, as detected at opening 14 to the channel 18, and the reduced pressure as detected at the constricted throat 15 which communicates with the channel 19. As herein illustrated, the support 17 is provided with a threaded cap C which is used only until the element is ready for installation.

In accordance with the present invention there is provided an adjustable calibrating ring 10 which is slidably mounted on the periphery of the Pitot-Venturi tube body 11 and adapted to be secured at any desired position on the tube body by means of set screws 12. The calibrating ring 10 causes an outward swirl of the gas passing at the outside of body 11, which swirl tends to carry along with it, gas molecules in the vicinity thereof. As the ring is brought nearer the region of the downstream end of the Venturi tube body, a greater amount of gas is swept from this region, hence decreasing the pressure at the downstream end or exit which encourges more gas to flow through the throat 15 of the body 11. The adjustable calibrating ring makes it possible to complete the necessary calibration adjustments on each Pitot-Venturi flow element at the laboratory by comparison with a desired standard. Therefore the adjustable calibrating ring 10 results in each Pitot-Venturi meter having the same calibration constants and precludes the necessity for individual treatment in the field.

What I claim is:

1. In a Pitot-Venturi flow element, a Venturi tube body adapted to be mounted in a stream of gas or the like, means communicating with the gas at two different points adjacent the body, and a barrier mounted externally of said tube, said barrier extending across said stream and adjustable along said body to modify the flow of said stream around the same whereby the flow characteristics of said element can be changed to correspond with a given standard element.

2. In a Pitot-Venturi flow element, a Venturi tube body adapted to be mounted in a stream of gas or the like, means communicating with the gas at two different points adjacent the body, and a ring encircling said body in engagement with the periphery thereof and adjustable along said body to modify the flow of said stream around the same whereby the flow characteristics of said element can be changed to correspond with a given standard element.

HENRY W. STOLL.

REFERENCES CITED

The following references are of record in the file of this patent:

UNITED STATES PATENTS

| Number | Name | Date |
|---|---|---|
| 2,240,119 | Montgomery et al. | Apr. 29, 1941 |
| 2,281,411 | Campbell | Apr. 28, 1942 |
| 2,362,393 | Naida | Nov. 7, 1944 |